United States Patent
Tehranipoor et al.

(10) Patent No.: US 12,235,959 B1
(45) Date of Patent: Feb. 25, 2025

(54) APPARATUS FOR PROTECTING AGAINST OPTICAL PROBING ATTACKS

(71) Applicant: University of Florida Research Foundation, Incorporated, Gainesville, FL (US)

(72) Inventors: Mark M. Tehranipoor, Gainesville, FL (US); Navid Asadi-Zanjani, Gainesville, FL (US); Mir Tanjidur Rahman, Gainesville, FL (US); Shahin Tajik, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 635 days.

(21) Appl. No.: 17/456,222

(22) Filed: Nov. 23, 2021

Related U.S. Application Data

(60) Provisional application No. 63/117,704, filed on Nov. 24, 2020.

(51) Int. Cl.
G06F 21/56 (2013.01)
G06F 9/30 (2018.01)
G06F 21/55 (2013.01)

(52) U.S. Cl.
CPC ........ *G06F 21/566* (2013.01); *G06F 9/30029* (2013.01); *G06F 21/554* (2013.01)

(58) Field of Classification Search
CPC ............... G06F 21/566; G06F 9/30029; G06F 21/554

See application file for complete search history.

(56) References Cited

U.S. PATENT DOCUMENTS

| | | | | |
|---|---|---|---|---|
| 9,287,879 | B2* | 3/2016 | Thacker | H01L 21/82 |
| 9,479,176 | B1* | 10/2016 | Eble, III | H03K 19/17768 |
| 10,146,964 | B1* | 12/2018 | Shah | G06F 21/76 |
| 10,262,956 | B2* | 4/2019 | Darmon | G06F 30/367 |
| 10,423,749 | B2* | 9/2019 | Rajendran | G06F 30/398 |
| 10,817,638 | B2* | 10/2020 | Wang | G06F 30/392 |
| 10,853,523 | B2* | 12/2020 | Sinanoglu | G06F 21/75 |
| 10,990,580 | B2* | 4/2021 | Sinanoglu | G06F 21/73 |
| 11,211,342 | B1* | 12/2021 | Lu | H01L 23/573 |
| 2010/0301903 | A1* | 12/2010 | Cocchi | H03K 19/20 326/122 |
| 2014/0270169 | A1* | 9/2014 | Delport | H04L 9/003 380/252 |

(Continued)

*Primary Examiner* — Nha T Nguyen
(74) *Attorney, Agent, or Firm* — Alston & Bird LLP

(57) ABSTRACT

Methods and systems are directed to protect a target logic circuit against optical probing attacks and conceal a logic state in the target logic circuit. The method comprises designing a concealing logic circuit. The concealing logic circuit can be coupled to complement of input signals of the target logic circuit, inserted as neighbor logic circuit of the target logic circuit, and placed in close optical proximity to the target logic circuit. The concealing logic circuit can operate in the opposite operation mode or logic state of the target logic circuit in response to the complement of the input signals to the target logic circuit. The method can further comprise designing an evaluation circuit that generates the complement of the input signals and minimizes a path delay between the target logic circuit input and the concealing logic circuit input.

16 Claims, 12 Drawing Sheets

(56) References Cited

U.S. PATENT DOCUMENTS

| | | | |
|---|---|---|---|
| 2014/0292371 A1* | 10/2014 | Di | H04L 9/003 326/95 |
| 2014/0375353 A1* | 12/2014 | Sinanoglu | H04L 9/0866 326/8 |
| 2015/0311202 A1* | 10/2015 | Kuenemund | H01L 23/528 257/369 |
| 2016/0034694 A1* | 2/2016 | Rajendran | G06F 30/30 713/190 |
| 2016/0224407 A1* | 8/2016 | Rajendran | G06F 11/079 |
| 2018/0089426 A1* | 3/2018 | Shi | G06F 21/755 |
| 2018/0137290 A1* | 5/2018 | Kwiat | G06F 21/32 |
| 2018/0232479 A1* | 8/2018 | Sinanoglu | G06F 30/39 |
| 2018/0302095 A1* | 10/2018 | Iyengar | H03K 19/17768 |
| 2018/0341737 A1* | 11/2018 | Chow | H01L 27/0207 |
| 2018/0342468 A1* | 11/2018 | Rajendran | G06F 30/3947 |
| 2019/0018936 A1* | 1/2019 | Zhou | H04L 9/3239 |
| 2019/0129892 A1* | 5/2019 | Sinanoglu | G06F 16/252 |
| 2019/0148312 A1* | 5/2019 | Simka | H04L 9/3278 257/401 |
| 2019/0258766 A1* | 8/2019 | Wang | H01L 21/02107 |
| 2019/0311156 A1* | 10/2019 | Tehranipoor | G06F 21/76 |
| 2019/0340394 A1* | 11/2019 | Sinanoglu | G01R 31/31719 |
| 2020/0226492 A1* | 7/2020 | Madani | G06N 3/08 |
| 2020/0251602 A1* | 8/2020 | Shen | H01L 23/573 |
| 2020/0285719 A1* | 9/2020 | Wang | G11C 29/32 |
| 2020/0311222 A1* | 10/2020 | Wang | G06F 30/398 |
| 2020/0342142 A1* | 10/2020 | Savidis | G06F 21/75 |
| 2021/0050351 A1* | 2/2021 | Chong | H01L 27/0207 |
| 2021/0066216 A1* | 3/2021 | Kuenemund | H01L 23/576 |
| 2021/0249364 A1* | 8/2021 | Chow | H01L 23/576 |
| 2021/0281390 A1* | 9/2021 | Chiang | H04L 9/003 |
| 2021/0342509 A1* | 11/2021 | Best | G06F 30/327 |
| 2022/0276303 A1* | 9/2022 | Martin | H04K 3/60 |
| 2022/0366113 A1* | 11/2022 | Song | G06F 30/327 |
| 2024/0202375 A1* | 6/2024 | Moser | G06F 21/85 |

* cited by examiner

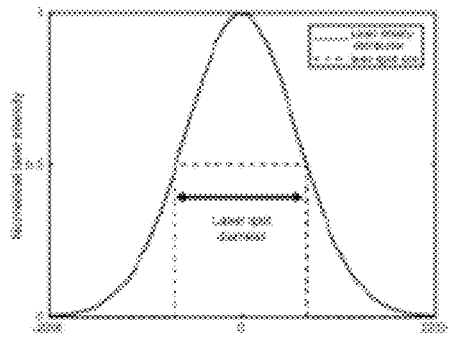
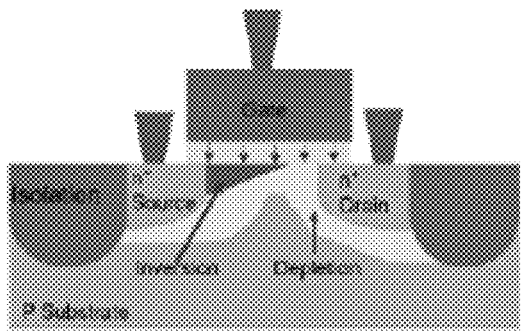
FIG. 4A    FIG. 4B
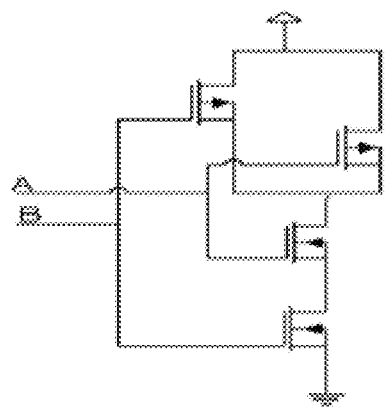
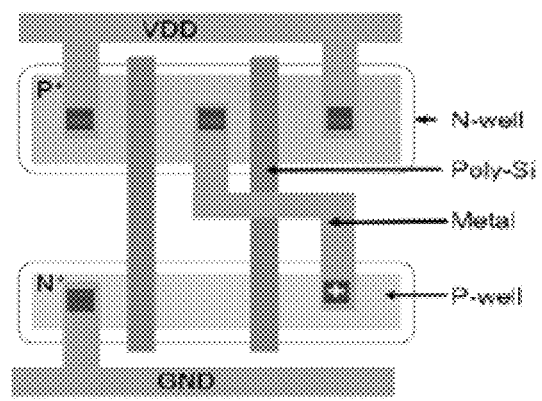
FIG. 5A    FIG. 5B

APPARATUS FOR PROTECTING AGAINST OPTICAL PROBING ATTACKS

CROSS-REFERENCE TO RELATED APPLICATIONS

The present application claims priority to U.S. Provisional Application Ser. No. 63/117,704, titled "APPARATUS FOR PROTECTING AGAINST OPTICAL PROBING ATTACKS," filed Nov. 24, 2020, the contents of which are incorporated herein by reference in their entirety.

GOVERNMENT SUPPORT

This invention was made with U.S. Government support under Agreement No. W9124P-18-9-0001 awarded by the Army Contracting Command-Redstone Arsenal to the AMTC. The government has certain rights in the invention.

BACKGROUND

The ubiquitous modern-day technologies for applications, ranging from low-power computing devices to automated vehicles to internet-of-things, are made viable due to the advent of System on Chips (SoCs). The sheer complexity in design, faster yield analysis, and defect localization have catalyzed the formulation of different integrated circuit (IC) debug and failure analysis (FA) techniques and tools. The existence of several metal layers on the frontside of the IC and new packaging technologies, such as ball grid arrays (BGA) and flip-chip technologies, resulted in a paradigm shift in the world of failure analysis. As a result, over the past two decades, there has been a significant advancement in FA and defect localization in integrated circuits (ICs) through chip backside using optical techniques, such as optical probing and its derivatives. Electro-Optical Probing (EOP) and Electro-Optical Frequency Mapping (EOFM) are examples of optical probing techniques, where the electric field in the device modulates the photons injected by a laser from the chip backside. Since the bulk silicon at the backside of the ICs is transparent to the near-infrared (NIR) photons, these "contactless" optical probing methods have facilitated functionality analysis and defect localization. The electro-optical methods analyze the reflected and modulated photons to predict the root-cause analysis of transistors and logic gates failure.

While these techniques have been initially developed for FA, it has been shown that an adversary can also misuse the FA's tools to violate the confidentiality, integrity, and availability of the hardware through physical attacks. Security features in SoCs have evolved to cope with physical attacks. For instance, tamper-proof memories, such as physical unclonable functions (PUFs), flash, EEPROM, have been proposed as a secure key-storage to protect the cryptomodules from physical attacks. Moreover, researchers have proposed security measures, e.g., protective shield, charge sensors, and explosive protected layers, to protect the secrets stored in an SoC. However, all of these countermeasures are based on a common assumption that device modification, for instance, backside polishing, or focus ion beam (FIB) editing, is always necessary for physical attacks.

Security designers have consistently underestimated the capability of the modern FA techniques, like optical probing. Optical probing enables an adversary to steal the chip secretes, such as cryptographic keys, user identity, data encryption keys, and logic locking key, without triggering any alarm implemented in the chip. Furthermore, in flip-chip packaging, which is widely used for most SoCs, optical probing can be performed in a non-invasive manner, e.g., without polishing the bulk silicon. Though the tamper- and read-proof memory may protect the assets in a powered-off device, the capability of optical probing techniques lies in the fact that they can probe either combinatorial or sequential logic elements connected to the protected memory and extract the assets during its transfer from the memory (e.g., see FIG. 1).

Several preventive and detection-based approaches have been already proposed to protect against optical attacks at different levels: packaging, device, and circuit. For example, at the device-level, an active optical layer is coated on the die backside. In this case, reflection from protective layers due to photons emitted from the light sources is monitored by the photon detector to identify any attempt of protective layer removal. Though this approach provides a general solution against the backside attacks, it still requires costly steps to integrate the layers and detectors into the standard complementary metal-oxide-semiconductor (CMOS) circuits. Similar to the protective optical layer, implementing metal layer and through-silicon vias to prevent polishing and FIBing attempts also suffer from high manufacturing cost and area overhead. On the other hand, classical solutions such as photo sensor-based approach cannot be used against optical probing since thermal laser stimulation is the base for EO analysis. The thermal laser does not generate electron-hole pairs. Hence, they remain undetected by photo sensors. Ring-oscillator PUFs were also used to capture abrupt temperature variation due to thermal laser. However, such sensors suffer from a higher area and power overhead, as well as a higher rate of false-positive.

Existing countermeasures are ad-hoc and provide inefficient protection, and therefore, significantly undermine the capability of an adversary. None of the current techniques are evaluated against the security metrics developed based on the physics behind optical probing, parameters related to standard logic cells, and capability of optical probing tool, e.g., laser scanning microscope. Besides, the aforementioned solutions require additional process steps and resources (for example, area and power) overhead.

Optical contactless probing is a contactless IC FA technique from the IC backside. Contactless interaction with the transistor requires much less effort than contact-based counterparts, e.g., electrical probing and circuit editing with FIB. In optical contact-based probing, the logical state of a sequential and combinatorial logic is identified based on the interaction between the laser and transistors. The switching electric field in the transistors modulates the amplitude and phase of the photons, reflected from different interfaces of the device, e.g., active region, oxide, and interconnects. During the switching of the applied voltage to the transistors, the free carrier density at the drain terminal of the MOSFET changes. The effect of free carrier density, $\Delta N_e$ and $\Delta N_h$, is dominant for 1.3 μm laser, which is used in the most modern-day optical probing. The absorption coefficient and the refractive index of silicon also varies depending on the density of free carriers in the device.

The variation in absorption coefficient, $\Delta \alpha$, and the index of refraction, $\Delta n$, can be defined as, $$\Delta n = \frac{\lambda^2 q^2}{8\pi^2 c_0^2 \epsilon_0 n_0} \left[ \frac{\Delta N_e}{m_e} + \frac{\Delta N_h}{m_h} \right] \quad (1)$$

and $$\Delta\alpha = \frac{\lambda^2 q^3}{4\pi^2 c_0^3 \epsilon_0 n_0} \left[ \frac{\Delta N_e}{m_e \mu_e} + \frac{\Delta N_n}{m_h \mu_h} \right] \quad (2)$$

where q, $\lambda$, $c_0$, $\epsilon_0$ represent the charge of the carrier, laser wavelength, speed of light, and permittivity of the free space, respectively, and $m_e$, $m_h$ are the effective mass of the electrons and holes, respectively. The carrier mobility, $\mu$, is a function of the temperature.

A photo-diode converts the modulated photons reflected from the device into an electrical signal (e.g., see FIG. 2). Depending on the nature of measurement, e.g., EOP or EOFM, the electrical signal is fed to a digital sampling oscilloscope or spectrum analyzer. In EOP measurement, the oscilloscope averages the collected electrical signal and synchronizes it with a trigger signal to create a time-domain waveform of the related voltage in the transistor. While EOP focuses on a single transistor, in the case of EOFM, the laser scans the region of interest (RoI) on the device and the reflected light is fed into a spectrum analyzer acting as a narrow band frequency filter. Therefore, EOFM synthesizes an activity mapped image of the RoI operating at the frequency set in the spectrum analyzer. The frequency-domain analysis of modulated photon significantly reduces the electro-optical signal acquisition period and improves the signal to noise ratio (SNR).

Reverse engineering can be interpreted in different ways in the context of hardware security. In this disclosure, a distinction is made between full-blown and partial reverse engineering. The full-blown reverse engineering focuses on analyzing the internal structure and implementation of the device. The objective of full-blown reverse engineering is to extract the functionality of the device.

On the other hand, obtaining information about the operation and functionality of the chip without exposing the RTL netlist is defined as partial reverse engineering. Side-channel leakages, such as electromagnetic radiation, power leakage, and photon emission, reveal sensitive information about chip operation and functionality.

The existence of a tamper- and read-proof memory is the primary assumption in all key-based security primitives, such as cryptomodule, secure boot-up, digital right management (DRM), and logic locking. It is assumed that the key stored in tamper-proof memory is secure and its contents cannot be extracted. In fact, there are memory technologies where it is tough to read the content, even with the most sophisticated FA tools, if no electrical interface is available to the outside world. A conventional example of such memory is the flash/EEPROM technology, where measuring the trapped charges in the floating gate of transistors is not a straightforward task. In contrast to flash/EEPROM memories, other NVM technologies, e.g., eFuses, battery-backed RAMs, and ROM, are more susceptible to direct readout.

However, regardless of the tamper-resiliency and security of the memory itself, the transmission of data from/to the memory still leaves the door open for an adversary to probe or tamper with the content of the memory, as shown FIG. 1. An adversary with FA capability can localize and probe the buffers and registers, responsible for the movement of security-sensitive data. Naturally, established countermeasures, such as memory encryption and authentication, are also not sufficient, since these solutions still require a secure memory to store encryption/authentication keys. Consequently, it is not sufficient to assume the existence of secure storage, ensures the security of the key.

Logic locking or logic obfuscation is a mechanism to hide the functionality of an IP by inserting additional logic gates into the netlist of IP. In logic locking, additional combinational or sequential logic gates are embedded into the design. The extra embedded logic gates are known as key-gates, which are connected to key, fed through a set of key-registers. The key-gates and key-registers comprised the key-delivery unit, a core-component of logic locking. The functionality of the chip or IP is unlocked once the correct sequence of the key is available at the input of the key-gates, hence, making the chip or IP inoperative for an unauthorized user or adversary. The key value is only available to the original component manufacturer (OCM) and the IP owner and is not available during the fabrication process. Logic locking is a classic example where the locking key is protected in a tamper-proof memory. Outside the tamper-proof memory, the key travels through the key-delivery unit. An adversary can optically probe the unlocking key once the components of the key-delivery unit are localized.

SUMMARY

Embodiments described herein provide for protecting a target logic circuit against optical probing attacks and conceal a logic state in the target logic circuit. An example method includes designing a concealing logic circuit. The concealing logic circuit can be coupled to complement of input signals of the target logic circuit, inserted as neighbor logic circuit of the target logic circuit, and placed in close optical proximity to the target logic circuit. The concealing logic circuit can operate in the opposite operation mode or logic state of the target logic circuit in response to the complement of the input signals to the target logic circuit. The method can further include designing an evaluation circuit that generates the complement of the input signals and minimizes a path delay between the target logic circuit input and the concealing logic circuit input.

Other systems, devices, methods, features and advantages of the subject matter described herein will be or will become apparent to one with skill in the art upon examination of the following figures and detailed description. It is intended that all such additional systems, methods, features and advantages be included within this description, be within the scope of the subject matter described herein and be protected by the accompanying claims. In no way should the features of the example embodiments be construed as limiting the appended claims, absent express recitation of those features in the claims.

BRIEF DESCRIPTION OF THE DRAWINGS

Reference will now be made to the accompanying drawings, which are not necessarily drawn to scale, and wherein:

FIG. 4A displays Gaussian distribution of an example laser intensity profile;

FIG. 4B illustrates different space charge region in an example MOSFET at saturation state;

FIG. 5A is an example circuit diagram of NAND logic gate;

FIG. 5B is an example standard cell layout design of NAND logic gate;

FIG. 18B displays EOFM measurement of example target logic elements with concealing gates in accordance with one embodiment of the present disclosure, wherein the key value is probed with an input vector 1100;

DETAILED DESCRIPTION OF VARIOUS EMBODIMENTS

Figure 1:
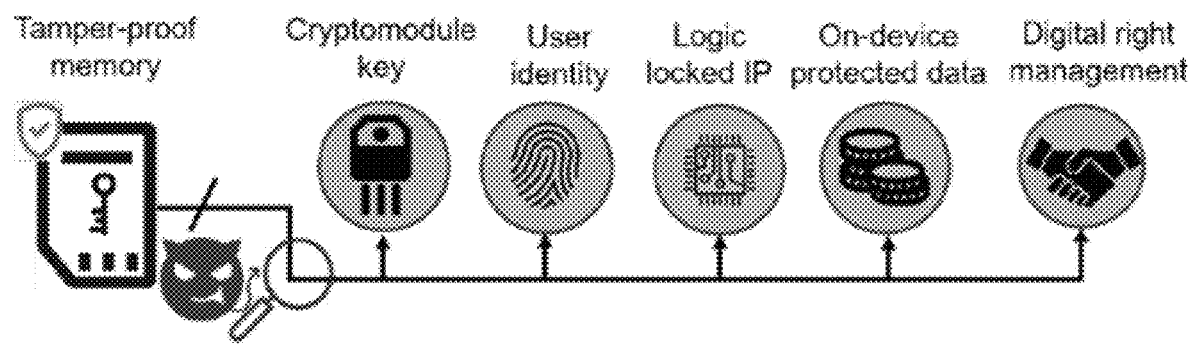
FIG. 1 is an example approach for key extraction during a key transfer between a secure memory and key-protected modules.
Figure 2:
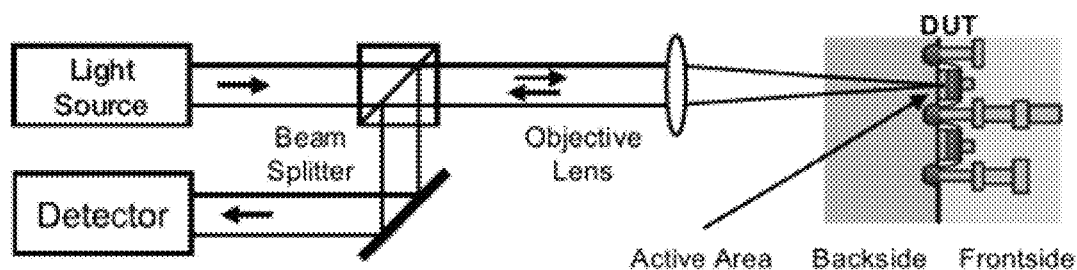
FIG. 2 is a simplified illustration of an example method for contactless optical probing signal acquisition.

This application is generally related to innovative countermeasures against optical probing. Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Modern Field Programmable Gate Arrays (FPGAs) and programmable System on Chips (SoCs) are used nowadays in different critical applications, e.g., aerospace, low-power computing devices. The sheer complexity in design, aggressive time-to-market has catalyzed the formulation of various IC debug and failure analysis (FA) techniques and tools. In the past two decades, due to increasing interconnect metal layers on the frontside of the ICs and new flip-chip packaging, FA analysis and defect localization through chip backside are becoming popular. The optical FA techniques, e.g., photon emission, laser-fault injection, optical probing, are based on silicon transparency towards near-infrared (NIR) photons. However, an adversary can also misuse the optical FA methods, e.g., optical probing, as a physical attack to expose the sensitive information, e.g., assets, accessible by the modern SoCs and FPGAs.

The two primary optical contactless probing techniques are electro-optical probing (EOP) and electro-optical frequency mapping (EOFM). While EOP can be used to probe electrical signals on the transistors directly, EOFM can be employed to create an activity map of active circuits. In both cases, the switching electric field in the transistors modulates the amplitude and phase photons reflected from active region of the device. In EOFM, a laser scans the region of interest on the device under test (DUT). The reflected light is fed into a spectrum analyzer, acting as a narrow band frequency filter to sample the signal for every scanned pixel. Then a PC is used to assemble the sampled frequency filter values into 2D image. In EOP measurement, an oscilloscope is used to average the collected electrical signal and synchronizes it with a trigger signal to create a time-domain waveform of the related voltage in the transistor.

Various embodiments of the disclosure generally relate to a method and system for hiding the state or stored bit in a logic gate and register. Instead of adding new manufacturing steps, the method is based on a standard logic cell, and is compatible with existing application-specific integrated circuit (ASIC) and FPGA design flow. In various embodiments, the conventional ASIC design flow can be used to identify security-critical circuits and one or more additional CMOS logic gate with selective input can be carefully placed to obscure the asset carrying gates activity. This additional logic gates is called "Concealing-Gate" in the disclosure.

Various embodiments of the disclosure use a careful selection of combinatorial and sequential logic gates, their inputs, and placement to camouflage the activity of the asset carrying logic elements. This approach will compel an adversary to focus on full-blown reverse engineering and extract the full functionality of IPs for each logic gates, hence, significantly increasing the time-cost of optical probing attack.

Instead of proposing a new standard cell, integration of new layers, or modification in packaging techniques, various embodiments of the disclosure can use the existing design ASIC flow.

Optical Contactless Probing

An attack approach using electro-optical techniques, e.g., EOP and EOFM, the source and analysis approach for electro-optical signal, and the features that influence successful EO signal extraction, are presented herein (e.g., referred to as optical contactless probing).

Attack Approach

During the physical attack, the ultimate goal of an adversary is to acquire the chip assets with minimum perturbing in the device. Therefore, the attacker may use the following steps to extract the target asset form the device.

Localizing the Point of Interest (PoI)

An adversary requires physical access to the device under attack (DUA) to extract the asset with optical probing. The adversary needs to identify a suitable combinatorial or sequential logic, which is termed as point-of-interest (PoI), for probing the asset. The adversary can identify the location of PoI using full-blown or partial reverse engineering. Without access to GDSII or netlist of the chip, automated delayering and imaging tool, invasive full-blown reverse engineering for functionality and connectivity extraction is an expensive, human labor intensive, and error-prone process. The objective of an unscrupulous entity, without access to GDSII, is fast asset extraction. Therefore, the adversary most likely to rely on a non-reverse engineering approach or partial reverse engineering. In a non-reverse/partial reverse engineering approach, an adversary can easily localize the non-volatile memory, cache, and ASIC, if the adversary has access to a laser scanning microscope (LSM), and/or photon emission microscope (PEM). Such a localization approach is faster and less expensive than a full-blown reverse engineering approach. This is most probably the most threatening attack scenario, where a single entity can rage a war against all the key-based security implementation of the device. For logic locking, the key-delivery unit can be optically probed to extract the locking key. Therefore, the adversary can localize the key-registers and key-gates using existing approaches.

Sample Preparation. The next step for attacking the PoI is preparing the sample. If the DUA is a non-flip chip, e.g., wire bond chip, the device can be optically probed by removing the package with acid etching or mechanical polishing. Unlike non-flip chip, a flip-chip can be optically probed without any further sample preparation, such as polishing, and anti-reflectant coating.

Optical Probing Measurement

Figure 3:
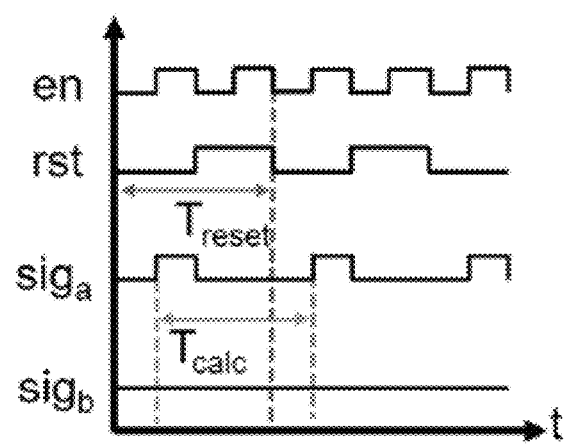
FIG. 3 is an example used to illustrate an optical probing measurement.

The EO signal measurement approach during contactless probing is discussed herein. The optical probing measurement for either EOP and EOFM can be explained with the waveform shown in FIG. 3. Two signals, $sig_a$ and sig are acting as input bit '1' and bit '0' to registers A and B, respectively. The reset signal is depicted with the waveform rst. $sig_a$ starts at the logic level low and then changes its state, as soon as the time needed for the preceding calculation (Tcalc) has elapsed. The rst signal resets the registers with a time period of Treset. As the time period for each consecutive power-on is constant, the time period for Tcalc is equal to the time period of Treset. Since $sig_a$ switches at the frequency of reset signal, the registers (to be specific transistors) connected to $sig_a$ also experience a change in the free carrier density and modulate the laser focused on the registers. Therefore, feeding the modulated signal to spectrum analyzer, a frequency domain 2D EOFM activity mapping can be generated. Similarly, feeding the modulated signal along with the rst signal to oscilloscope, instead of spectrum analyzer, a time domain waveform can be generated which is known as EOP signal. The rst signal acts as a reference signal for EOP analysis. Unlike $sig_a$, $sig_b$ does not change its status with reset signal, hence does not affect the outcome of EOP/EOFM measurement.

Influential Elements in Optical Probing

The elements that influence the optical probing evaluation and performance of the LSM during optical contactless probing are discussed herein.

Optical Resolution

Optical resolution is the minimum distance required to distinguish between two point-source through any optical system. According to Abbey's criterion, optical resolution, R, of any diffraction-limited microscope objective, which is also applicable for laser scanning microscope, is defined as, $$R = \frac{\lambda}{2NA} \tag{3}$$

where, NA is the numeric aperture of the objective lens. Lowering the wavelength of laser or increasing the NA can significantly improve the resolution of the optical probing.

As the semiconductor industry scale down the technology nodes, the distance between the transistors and logic gates also reduces. Since in EOFM analysis, 2D mapping of two different logic gates activity requires distinguishable edges between two logic gates/transistors, reaching the limit to optical resolution impact the EOFM measurement.

Laser Properties

Laser wavelength, spot size and intensity distribution play an important role in the optical probing analysis.

Laser Wavelength: The influence of the wavelength on the absorption coefficient is a major concern for the measurement. Laser with higher energy than silicon bandgap ($\lambda$<1.1 µm) generates photo carriers in the silicon devices. This effect is widely known as photoelectric laser stimulation (PLS), which is responsible for injecting unintentional faults in the device. Hence, 1.3 µm lasers are mostly used in most industry-standard LSM. However, smaller wavelength lasers promise better resolution for optical probing (see Eq. 3).

Laser Spot Size: The reflected laser response during EOFM/EOP measurement is influenced by all the transistors covered by the laser spot size. It is assumed, the laser intensity used for optical probing follows the Gaussian distribution function. The diameter of the laser is defined at the full width at half maximum of the intensity (FWHM) of the laser (see FIG. 4A) which is equal to the diameter of the Airy disk, $D_{airy}$, $$D_{airy} = \frac{1.22\lambda}{NA} \quad (4)$$

In confocal microscopy, the spread of the laser beam is further reduced by $\sqrt{2}$. Therefore, the spot size of the probing signal is, $$D_{spot\,size} = \frac{1.22\lambda}{\sqrt{2}\,NA} \quad (5)$$

Table 1 presents the optical resolution determined from Eq. 3 and the laser spot size calculated from Eq. 5 for two different widely used lens—20X and 50X, in state-of-the-art LSM.

TABLE 1

Optical Resolution and laser spot size for different laser wavelengths and lens used in LSM.

| lens | Numerical Aperture (NA) | Optical Resolution (nm) $\lambda = $ 1300 nm | $\lambda = $ 1064 nm | Laser Spot Size (nm) $\lambda = $ 1300 nm | $\lambda = $ 1064 nm |
|---|---|---|---|---|---|
| 20x | 0.40 | 1625 | 1330 | 2803 | 2295 |
| 50x | 0.76/1 | 855/650 | 700/532 | 1476/1121 | 1208/918 |

The reflected laser is modulated not only by the transistor or logic gate on which the laser is focused. The intensity of the reflected laser is a complex sum of intensity modulation caused by each logic gates under the laser spot. Hence, the EOFM and EOP measurements can significantly differ from the expected outcome. Therefore, the intensity of the reflected modulated photons can be represented in a simplified way, $$I_{total} = \sum_{x=-D_{spot\,size}/2}^{D_{spot\,size}/2} I_x \quad (6)$$

Where, $I_x$ is the reflected modulated laser intensity. The intensity of the reflected laser is dependent on the node size, operating voltage, and device terminal, e.g., source/drain and gate, under laser spot. Such dependency of reflected laser modulation can be utilized to induce cross-talk during EOFM and EOP measurements. The intensity of the $I_{total}$, to some extent, can be maintained constant for the RoI, by keeping the free-carrier density stable and total number of switching in logic gates/transistors fixed.

Position of Laser Beam on Device

One of the major challenges in the optical probing signal acquisition is low SNR. The probing signal is acquired multiple times by running the device in a reset loop to mitigate low SNR. The laser modulation depends on the laser beam position on the transistor, e.g., the drain, source, and gate region. The laser travels through different space charge region (SCR) depending on the area under the laser. For instance, in FIG. 4B, if the laser is focused on the drain of the transistor, the photons get modulated at the SCR-diffusion interface. Unlike the drain region, focusing the laser on the gate terminal allows free carriers in the inversion channel and depletion region to modulate the reflected laser.

CMOS standard cell contains complementary NMOS and PMOS transistor. The logic state of the cell can be extracted by focusing the laser on either PMOS or NMOS. The output waveform in the EOP signal is inverted to each other. In EOFM analysis, both PMOS and NMOS will appear as active nodes, however, the intensity of NMOS is higher than the PMOS transistors.

Width of CMOS Gates

Figure 6:
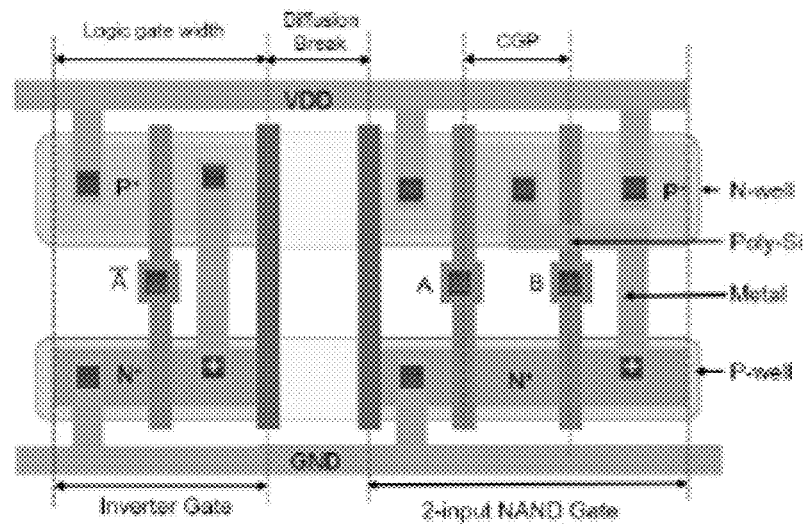
FIG. 6 displays nominal logic gate width for an example inverter gate and an example 2-input NAND gate.

Continuous shrinking in technology node allows more transistors in the same area. Due to the bottleneck of optical resolution, the width and height of transistors in a chip have a significant influence on the end-result of EOFM and EOP measurement. For instance, the laser can be focused on a single logic gate for a larger technology node. However, the same laser spot may cover multiple logic gates in smaller technology nodes, hence, deviating from the ideal optical probing condition where the logic gates under laser spot only modulates the laser. Therefore, the area of the transistors and logic gates, e.g., the height and width of the logic gates, is crucial for any circuit based countermeasure. The width of the logic gate, $W_{logic\,gate}$, can be defined as a multiplier of contact gate pitch (CGP) (also known as contact poly pitch (CPP) and simply gate pitch), and metal pitch, respectively. Therefore, the width of the logic gates can be defined as, $$W_{logic\,gate} = (n+1) \times CGP \quad (7)$$

where n is the number of poly gates in the logic cell. FIG. 6 represents the width of INVERTER and NAND gate, where n is 1 and 2, respectively. From Eq. 7 the width of the logic gates can be calculated for different technology nodes. The diffusion break width is 1×CGP for device implemented with double diffusion break (DDB) FinFET technology. In half-pitch, $\lambda_{halfpitch}$, based design rule, the width of source drain is defined as $7\lambda_{halfpitch}$ and the spacing between the two diffusion can be defined as $4\lambda_{halfpitch}$.

During EO based attacks, the logic gate targeted for optical probing and neighbor logic gates under laser spot modulates the photons amplitude and phase. Therefore, the total logic gate width under laser spot facilitate in calculating the $I_{total}$ in Eq. 6. The total width, $W_{total\,width}$, of the logic gates under laser spot can be expressed as, $$W_{total\ width} = W_{target\ cell} + \sum_{i=1}^{n} K_i \times W_{neighbour\ cell_i + nW_{break}} \quad (8)$$

Here, $W_{target\ cell}$, $W_{neighbour\ cell}$, and $W_{break}$ represent the width of target cell for optical probing, neighbor cell, and diffusion break, respectively. The maximum of total logic gate width under laser stimulation, $W_{total\ width}$, is the diameter of the laser spot size. The width of the logic gates can be calculated from Eq. 7 and $\lambda_{halfpitch}$ based design rules. $K_i$ is the ratio of logic gate width covered by the laser spot and total width of the logic gate. The value of $K_i$ can be less than or equal to 1 for the logic gates at the edges of the laser spot.

Example Apparatus Architecture for Implementing Embodiments of the Present Disclosure Attack Model The threat model considered for the various embodiments of the disclosure is presented herein. The key-based security measures are impotent once an adversary has access to the key. In logic locking, during the boot-up process, the key-delivery unit read the key value from the key-storage and, through interconnects, fed the key in the key-delivery unit, e.g., the key-registers and key-gates. An adversary can use optical probing to extract the key from the key-delivery unit, e.g., the key-gates and key-registers. Though the interconnects carry key signals, interconnects' contribution to optical modulation is negligible. Consequently, the interconnects are considered secured against electro-optical attacks. The embodiments may assume an electrical probing protection mechanism is available in the DUA.

For a successful attack against key-protected security primitives, the following information is assumed to be available to the attacker. The adversary has access to an operational IC and knows the functionality of the chip. Second, the attacker has access to an optical probing system; such a system is available in any FA lab and can be rented for a couple of hundred dollars per hour. In addition to that, the attacker may need standard lab equipment, e.g., hotplate, logic analyzer, which are available in the market. It is assumed that the adversary is interested in partial/non-invasive reverse engineering to utilize the fast key localization approach.

Countermeasure

Selection of Concealing-Gate and Concealing-Input

CMOS is mostly used in logic gates to implement complex Boolean functions in digital implemented circuits. Depending on free carrier density in the transistors, the ON/OFF state of the MOS device can be determined. At static condition, all inputs are held at some valid logic level, e.g., input signal switching 0→0 and 1→1, and the circuit is not switching its state. At this state, CMOS logic consumes static power. The leakage current is the primary cause of static power consumption in the circuit. Consequently, the density of the free carrier in the MOS transistor does not change significantly. Therefore, the photons are not modulated by the transistor activity. On the other hand, CMOS logic gates consume dynamic power when the input switches, e.g., switching from 0→1 and 1→0, at a high frequency. Charging and discharging of load capacitance in a logic gate acts as the source of dynamic power consumption. The charging and discharging of load capacitance affects the free-carrier density in the MOS transistor, hence modulating the reflected laser. Therefore, irrespective of the change in the logic state, e.g., the output of the CMOS gate, transition in the input signal (0→1 transition and vice versa), modulates reflected photons. An adversary uses the modulated reflected laser to extract the time-domain and frequency-domain state of the logic gates.

Various embodiments of the disclosure can hide the switching activity of the logic elements, connected with the key carrying nets, from optical contactless probing. The logic gates and registers connected to the key nets are the target-logic gate and target-register for an adversary. The switching activity of the target-logic elements can be concealed by introducing additional logic gates as neighbor cells. These additional neighboring logic gates are termed as "CONCEALING-Gate" in this disclosure. The activity of the key-gates/registers can be camouflaged using the following two principles.

(1) EOFM Concealing: The EOFM activity of the target-logic gates are camouflaged if the concealing-logics/transistors and target-logics/transistors are placed at a shorter distance than optical lens resolution. Therefore, the absence of EOFM activity due to the static state of target-logics/transistors, e.g., 0→0 due to reset operation, can be camouflaged by inducing dynamic state, e.g., 1→0 due to reset operation, in concealing-logics/transistors.

(2) EOP Concealing: In a certain time-frame, the amplitude of the EOP waveform can be maintained at a constant value if the integrated reflected photon intensity remains constant within a tolerable limit. This can be achieved by inducing cross-talk in the EOP waveform by turning ON concealing-logics/transistors when the transistors of the target-logic are operating at static state.

The aforesaid principles can be fulfilled through the following conditions.

(1) EOFM Concealing:
  (a) Frequency Matching: The nodes operating at the center frequency of the low-pass filter in the spectrum analyzer, only appear in the 2D mapping of EOFM signal. Therefore, concealing-logics' switching frequency must be the same as target-logics' switching frequency.
  (b) Switching Inputs: The transistors connected to the input signal, switching 1→0 during reset operation, only appear in the EOFM signal. Hence, concealing-logic must be at the dynamic state when the target-logic is operating at a static state. Note that in EOFM mapping, the activity of NMOS transistors is more prominent than the PMOS transistors' activity.
  (c) Distinguishable Edges: Extracting the logical state of a transistor/logic gate from an EOFM measurement requires an understanding of the shape and distinguishable edges of active nodes. In addition, EOFM measurement contains spatial information of an active node. Therefore, indiscernible EOFM activity edges of concealing and target-logic/transistor improve the camouflaging of the key-gate/register activity. An abrupt change in the shape of concealing- and target-logic/transistor is also undesirable, since the change may be detectable through image processing and computer vision.
(2) EOP Concealing:
  (a) Integrated Output: Transistors'/Logic gates' contribution to the EOP signal is dependent on the free carrier density in the device. Therefore, the ON/dynamic state of the concealing-gates/transistors can contribute to the EOP signal, when the target-gates/transistors operate at OFF/static state, hence, impede the EOP signal to change its state. Therefore, alternating ON/OFF state of concealing- and target-logics/transistors facilitate in maintaining a similar free-carrier density.

(b) Reference Signal: the trigger signal provided to the oscilloscope act as a reference signal for the time-dependent EOP waveform generation.

Figure 7:
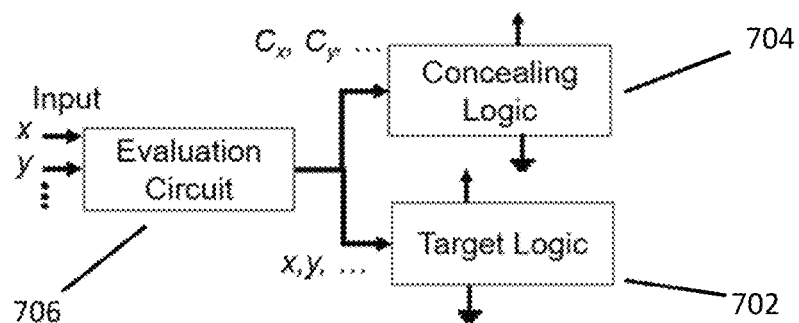
FIG. 7 is a block diagram of an example implementation of a concealing logic and a target logic, in accordance with some embodiments of the present disclosure.

FIG. 7 shows a block diagram of an example implementation of a concealing logic and a target logic, in accordance with one embodiment of the present invention. The block diagram of the example implementation comprises the target logic 702 and the concealing logic 704. One or more input signals are coupled to the input of the target logic 702, and complementary signals (or inverted signals) of the one or more input signals are coupled to the input of the concealing logic 704. The block diagram of the example implementation may also comprise an evaluation circuit 706. The target logic 702 and the concealing logic 704 can be coupled to the one or more input signals through the evaluation circuit 706. In some embodiments, the evaluation circuit 706 can generate the complementary signals of the one or more input signals for the concealing logic 704. The evaluation circuit 706 can also minimize the path delay between target and concealing gate input.

Figure 8:
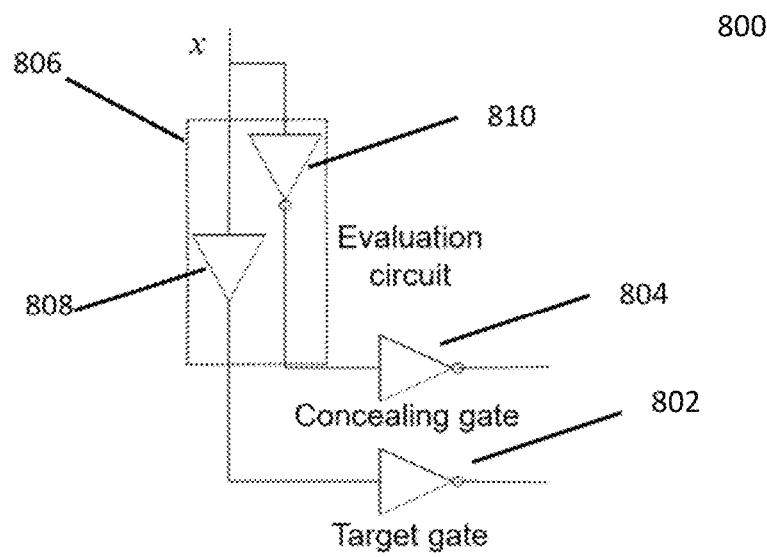
FIG. 8 is an example gate-level implementation of concealing logic and target logic for an inverter gate, in accordance with one embodiment of the present disclosure.

FIG. 8 shows an example gate-level implementation 800 of concealing logic and target logic for an inverter gate, in accordance with one embodiment of the present invention. The example gate-level implementation 800 comprises a target inverter gate 802 and a concealing inverter gate 804. The example gate-level implementation 800 further comprises an evaluation circuit 806, and the evaluation circuit 806 comprises a buffer 808 and an inverter 810. An input signal x is coupled to the input of the target inverter gate 802 through the buffer 808, and is coupled to the input of the concealing inverter gate 804 through the inverter 810.

Figure 9:
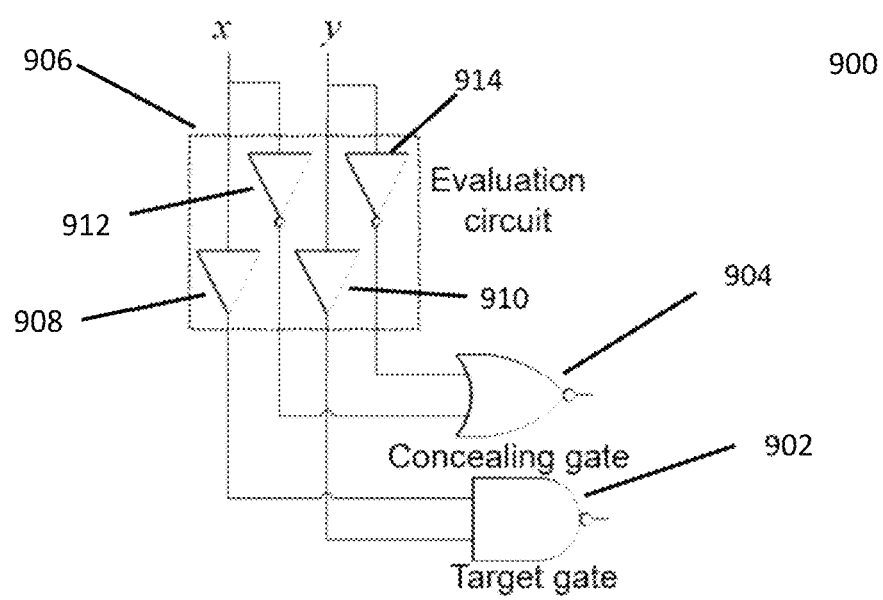
FIG. 9 is an example gate-level implementation of concealing logic and target logic for a NAND gate, in accordance with one embodiment of the present disclosure.

FIG. 9 shows an example gate-level implementation 900 of concealing logic and target logic for a NAND gate, in accordance with one embodiment of the present invention. The example gate-level implementation 900 comprises a target NAND gate 902 and a concealing NOR gate 904. The example gate-level implementation 900 further comprises an evaluation circuit 906, and the evaluation circuit 906 comprises two buffers 908, 910, and two inverters 912, 914. Two input signals x and y are coupled to the two inputs of the target NAND gate 902 through the buffers 908 and 910 respectively, and are coupled to the two inputs of the concealing NOR gate 904 through the inverters 912 and 914 respectively.

In complementary metal-oxide-semiconductor (CMOS), the dynamic power is consumed during the switching of inputs, e.g., 1→0 transition and vice versa. The photons are modulated by the free-carrier density in the transistors connected to switching input. In optical probing, the signal generated from the modulated photons is used to extract the time-domain (e.g., EOP) and frequency-domain (e.g., EOFM) state of the logic gates. In various embodiments of the present invention, such as those in FIGS. 7-9, the objective of the concealing logic gate is to camouflage the switching activity in the target logic gate.

The concealing gate can be a standard logic gate. The nature of the concealing gate, e.g., Inverter, NAND, NOR, can be defined based on design resources, e.g., area, power and delay. For a logic function, $f(x, y, z)$, the concealing gate can be defined by $\bar{f}(C_x, C_y, C_z)$. Stated otherwise, the concealing gate's input can be the complement of the input of the logic function (or the target gate), and the corresponding output of the concealing gate can be the complement of the output of the logic function (or the target gate).

Table 2 illustrates the optical probing results of an example embodiment of the present invention for different switching of an input or output signal. As shown in Table 2, the logic gates, either target or concealing logics are switching during optical probing, hence, expected to appear as active node in EOFM measurement. Similarly, the combined activity of the proposed approach is expected to generate an EOP signal with a fixed value. Therefore, optical probing signal cannot be interpreted without a complete understanding of the gate-level implementation of the netlist.

TABLE 2

Optical probing results of a target and concealing gate for different input switching

| Input/Output Switching for Target Logic | Optical probing signal for Target Logic | | Optical probing signal for Concealing Logic | | Combined Optical probing of Target and Concealing gate under laser spot | |
|---|---|---|---|---|---|---|
| | EOFM Activity | EOP Output | EOFM Activity | EOP Output | EOFM Activity | EOP Output |
| 0→0 | No | 0 | Yes | 1 | Yes | 1 |
| 0→1 | Yes | 3 | No | 0 | Yes | 1 |
| 1→0 | Yes | 0 | No | 1 | Yes | 1 |
| 1→1 | No | 1 | Yes | 0 | Yes | 1 |

The free carrier density of a logic gate varies with the transistors' switching activity. It is a well-known fact that the MOSFET current is a function of the inversion charge density. The charge density of two adjacent identical transistors, e.g., transistors with same width and length, operating at the matching drain/source/gate voltage can be considered identical. Therefore, between two transistors, total free carrier density can be maintained similar, if the poly-gate input voltage of the two transistors is inverted.

Figure 10A:
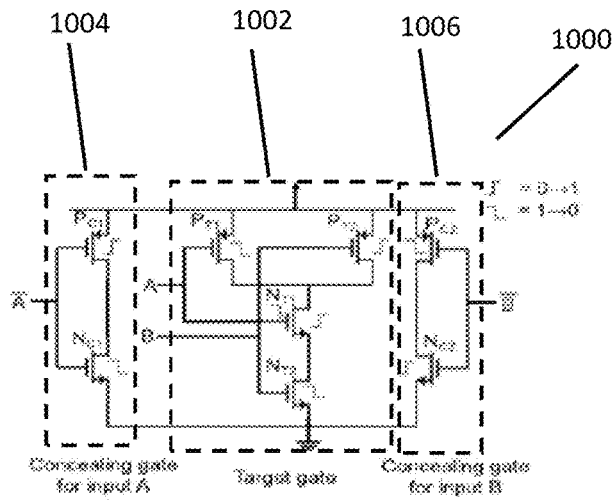
FIG. 10A illustrates an example implementation for concealing target NAND gate activity with input A switching from logic 0 to logic 1 and input B switching from logic 1 to logic 0, in accordance with one embodiment of the present disclosure.
Figure 10B:
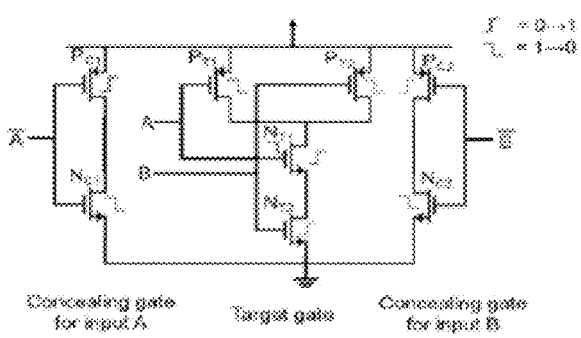
FIG. 10B illustrates an example implementation for concealing target NAND gate activity with both input A and input B switching from logic 0 to logic 1, in accordance with one embodiment of the present disclosure.

This can be explained by an example implementation 1000 for concealing NAND gate activity presented in FIGS. 10A, 10B. In FIG. 10A, the example implementation 1000 comprises a NAND gate 1002 and two inverter gates 1004, 1006. The NAND gate 1002 and the inverter gates 1004, 1006 are assumed to be target-gate and concealing-gates, respectively. The input of the NAND gate 1002 is coupled to inputs A and B (also called target input signals herein). The inputs of the inverter gates 1004 and 1006 are coupled to the complements of the inputs A and B (or the inverted target input signals) respectively. In the example implementation 1000, the inverter gates 1004, 1006 are concealing gates for inputs A and B respectively. The operation of the concealing gate 1004 for input A is used as an example to illustrate how the switching activity of the corresponding NMOS transistor in the target NAND gate is camouflaged herein. The concealing gate 1006 camouflages the input B signal switching in a similar manner. For input A=1, e.g. input A is at a logic high level, the NMOS, $N_{T1}$, of the NAND gate 1002 is turned ON (or operates in the saturation region), whereas the NMOS, $N_{C1}$, of the inverter 1004 operates in the cutoff region. For input A=0, e.g. input A is at a logic low level, the NMOS, $N_{T1}$, of the NAND gate 1002 operates at the cutoff region, whereas the NMOS, $N_{C1}$, of the inverter 1004 is turned ON. Therefore, the total free carriers on the area of the two NMOS transistors, $N_{T1}$ and $N_{C1}$, can be considered constant within a tolerable limit when the two transistors have the same width and length. Applying the inverted target input signal to concealing-logic/transistor allows the transistors mentioned above to operate at the same switching frequency. In addition, one of the transistors must appear as an active node in the EOFM 2D mapping since at least one of the transistors must switch from 1→0 during reset operation. Hence, the "frequency matching" and "switching inputs" conditions for EOFM concealing are fulfilled. Due to similar reason, either concealing-gate or target-gate act as the source of modulation of reflected photons and contribute to integrated EOP signal. Consequently, the EOP signal can be interpreted as "1" when compared with the reference signal. A security designer can choose INVERTER, NAND/NOR gate, to conceal the target-logic activity.

Concealing-Gate Placement in Layout

Figure 11A:
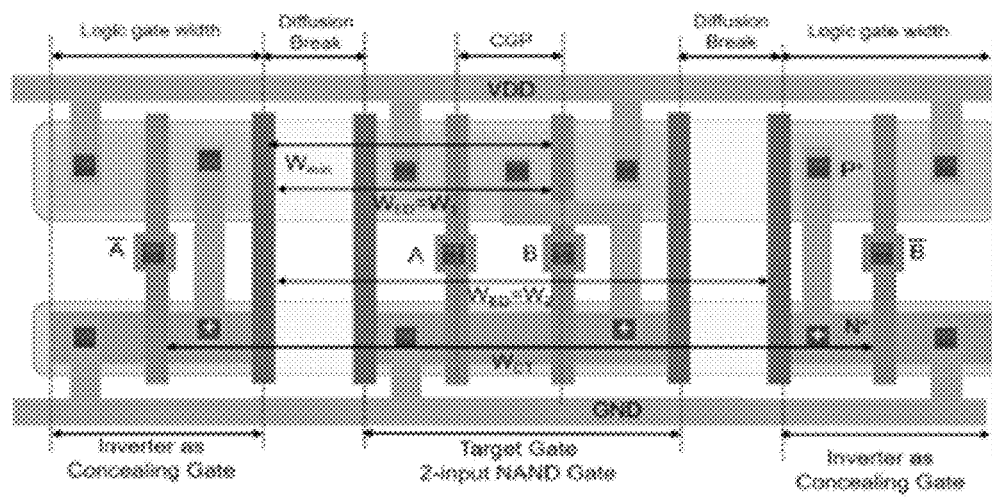
FIG. 11A is an example layout of an example implementation of a target NAND gate and two concealing inverter gates, in accordance with one embodiment of the present disclosure.
Figure 11B:
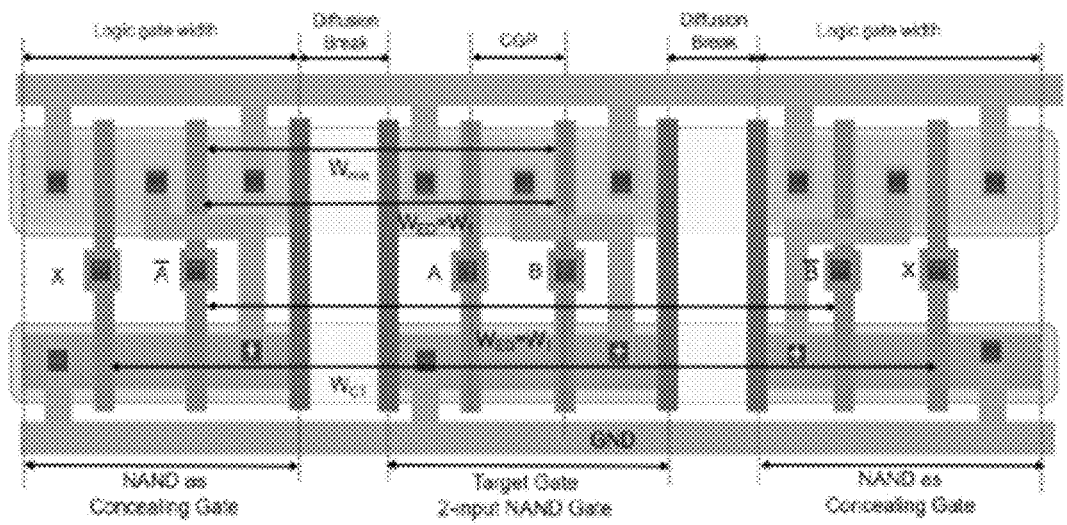
FIG. 11B is an example layout of an example implementation of a target NAND gate and two concealing NAND gates, in accordance with one embodiment of the present disclosure.

To mask the EOFM activity of the target-gate, the edges between the concealing- and target-logic/transistor need to be indistinguishable. Therefore, the concealing- and target-gates need to be placed at a distance less than the optical resolution considered during the IC security design. It has already been proved that photons modulated at the drain terminal contribute the most in EOFM/EOP measurement. Hence, in the device layout, the drain terminals of the concealing-transistors must be placed at the minimum distance from the corresponding target transistors (See $W_{min}$ in FIG. 11A and FIG. 11B). The activity of the asset carrying transistors can be camouflaged by maintaining the distance, $W_{min}$, between the drain edge of the concealing-gate and the furthest edge of the asset carrying transistor lower than the optical resolution, e.g., $W_{min} \leq R$. Though, this is a condition for hiding the target-gate activity, but not the sufficient one. An adversary may apply different input patterns to identify the edge of the EOFM activity of the concealing- and target-gate. The edges of EOFM activity of two transistors operating at opposite phase change can be resolved, though the gates are placed at a distance lower than optical resolution. The edges of EOFM activity become obscure if the adjacent transistors, placed at optical resolution distance, are switching in the same direction, e.g., 1→0 and vice versa. The distance between the two same direction phase changing transistors is defined as $W_{ED}$ (See FIG. 11A and FIG. 11B). For example, in FIG. 10A, the $N_{C1}$ and $N_{T2}$ transistors change phase in the same direction, e.g., 1→0, when reset is pressed. According to FIGS. 11A and 11B, the distance between these two transistors is defined as $W_1$. Therefore, the transistors' edges in the EOFM activity is not distinguishable, if the distance between the two transistors, is less than the optical resolution, e.g., $W_1 \leq R$. The worst-case scenario is, transistors $N_{C1}$ and $N_{T2}$ are changing phases in the opposite direction (see FIG. 10B). However, the target-logic's activity remains hidden if the distance between $N_{C1}$ and $N_{C2}$ transistors, $W_2$ in FIGS. 11A and 11B, is less than optical resolution.

Security Evaluation of Presented Countermeasure

To evaluate the optical probing resiliency of the method disclosed herein, a security metric is developed that is based on the two crucial parameters for optical contactless probing-(a) Optical resolution of the LSM, (b) Spot size of the laser source.

EOFM Differentiability Metric. An adversary can probe a logic gate, if edge differentiability metric, $f(ED)$, for an optical probing system is larger than "1".

$$f(ED) = \frac{W_{ED}}{R} \quad (9)$$

Lower the value of $f(ED)$ indicates higher complexity in EOFM analysis. $W_{ED}$ is the interspacing between two adjacent nearest edges of transistors switching at the same phase change direction.

In NAND gate in FIGS. 11A, 11B, the input signal is assumed to be the key-bit signal. The minimum $W_{ED}$ is achieved when the concealing-gate input, $\overline{A}$ and NAND gate input, B change phase at same direction. The maximum distance appears when the concealing-gates, A and $\overline{B}$, switching direction is the same. Table 3 summarizes the $W_{ED}$ for different inputs switching scenarios. The diffusion break is assumed to be equal to CGP. The EOFM measurement complexity metric for NAND/NOR gate has been calculated for different node technology and presented in Table 4. As seen in Table 4, it is evident that logic gates fabricated at a technology node lower than 45 nm can be concealed effectively.

EOP Cross-talk Metric. In the presented countermeasure, the concealing-gates are the neighbor cells for the target-cell. Therefore, if the $W_{total\ width}$ calculated from Eq. 8, is smaller than laser spot size, $D_{spot\ size}$, the concealing-gate will contribute to the EOP signal while the target-transistors are either turned OFF or static state. The cross-talk induced in an EOP signal is proportional to the total transistor width covered by the laser spot size. The calculated $W_{total\ width}$ must include the drain regions of concealing-gates, see the distance $W_{CT}$ shown in FIG. 11A. Hence, the EOFM measurement complexity metric in terms of induced cross-talk is, $$f(CT) = \frac{w_{CT}}{D_{spot\ size}} \quad (10)$$

Table 5 shows the security metric evaluation for different technology nodes. It is evident from the analysis that concealing-gates can be used to protect the target-gates implemented in 45 nm or smaller technology nodes.

TABLE 3

The $W_{ED}$ for A signal concealing-gate for different Logic gates/transistors depending on their phase change direction.

| Input Signal | Phase Change After Reset | Distance with the concealing-Gate in terms of CGP |
|---|---|---|
| *concealing-Gate Signal, A | 1 → 0 | — |
| *Key-gate Input Signal (Key Value), A | 1 → 0 | No EOFM activity |
| Key-gate Input Signal,B (Two possible inputs) | 1 → 0 | 3 × CGP ($W_1$ in FIG.11a) |
|  |  | 4 × CGP ($W_1$ in FIG.11b) |
|  | 0 → 0 | No EOFM activity |
| concealing-Cate Signal,B (Two possible inputs) | 0 → 0 | No EOFM activity |
|  | 1 → 0 | 5 × CGP ($W_1$ in FIG.11a) |
|  |  | 7 × CGP ($W_1$ in FIG.11b) |

*= it is assumed that A is the key bit signal. Therefore all distance is presented in terms of concealing-gate for signal A.

TABLE 4

EOFM edge differentiability metric calculated for different node technology for concealing-INVERTER gate and Target NAND gate.

| Technology Node (nm) | CGP (nm) | $W_{ED} =$ $W_1 =$ 3 × CGP | f(ED) for λ = 1300 nm | f(ED) for λ = 1064 nm | $W_{ED} =$ W = 5 × CGP | f(ED) for λ = 1300 nm | f(ED) for λ = 1064 nm |
|---|---|---|---|---|---|---|---|
| 90 | 260 | 780 | 0.91 | 1.11 | 1300 | 1.5 | 1.9 |
| 65 | 220 | 660 | 0.78 | 0.94 | 1100 | 1.3 | 1.6 |
| 45 | 160 | 480 | 0.56 | 0.69 | 800 | 0.94 | 1.14 |
| 32 | 112 | 360 | 0.42 | 0.51 | 600 | 0.70 | 0.86 |
| 22 | 90 | 270 | 0.31 | 0.39 | 450 | 0.53 | 0.64 |
| 14 | 70 | 210 | 0.24 | 0.3 | 350 | 0.41 | 0.5 |

TABLE 5

EOP cross-talk metric calculated for different node technology.

| Technology Node (nm) | CGP (nm) | INVERTER as concealing-Gate, $W_{CT} =$ 7 × CGP (nm) | f(CT) λ = 1300 nm | f(CT) λ = 1064 nm | NAND as concealing-gate, $W_{CT} =$ 9 × CGP (nm) | f(CT) λ = 1300 nm | f(CT) λ = 1064 nm |
|---|---|---|---|---|---|---|---|
| 90 | 260 | 1820 | 1.23 | 1.50 | 2340 | 1.58 | 1.93 |
| 65 | 220 | 1540 | 1.04 | 1.27 | 1980 | 1.34 | 1.63 |
| 45 | 160 | 1120 | 0.75 | 0.92 | 1440 | 0.97 | 1.19 |
| 32 | 112 | 784 | 0.53 | 0.64 | 1008 | 0.68 | 0.83 |
| 22 | 90 | 630 | 0.42 | 0.52 | 810 | 0.54 | 0.67 |
| 14 | 70 | 490 | 0.33 | 0.40 | 630 | 0.42 | 0.52 |

Countermeasure for Latch and Flip-flop

The countermeasure disclosure herein is equally applicable in hiding the asset information stored in the flip-flop. The sequential logic elements can be protected by two different approaches. First, each combinatorial logic used to design target-flip-flop must be protected with a concealing-gate connected to the inverted input of that combinatorial logic. Second, a security designer can use concealing-flip-flop to protect the target-flip-flop. In the later approach, the logic gates used as building block for the concealing-flip-flop must be placed next to its corresponding target-flip-flop building block logic gates in the layout. Hence, no additional standard cell design is required.

Target-gate Selection

Adding a concealing-gate for each of the target-logic increases the area and power overhead. Besides, random insertion of concealing-gates does not offer any improvement in security against optical probing. In logic locking, embodiments of the invention can select key-gates/registers to protect using the concealing-gate. Note that, in more general scenarios, a security designer can identify the key carrying net and corresponding target-logic gate/registers in a more systematic manner using the developed target-gate selection metric.

Validation of Presented Countermeasure

In this disclosure, the concealing-logic gate based logic gate activity camouflaging approach is evaluated through simulated EOP waveform generation.

Fundamentals of Simulated EOP Waveform Generation

The reflected photon modulation capacity of devices, such as free carrier absorption, is linearly related to the voltage at the MOSFET terminals. The modulation capacity of each terminal of the transistor can be calculated from the area of each terminal and piece-wise voltage changes. For simplicity, it is assumed that over the entire width or area of a MOSFET terminal, the voltage only varies with time, e.g., each transistor terminal acts as an equipotential surface. The modulation capacity of the terminal can be defined as, $$M_i = k_i \times W_i \times \Delta v_i \quad (11)$$

where, $k_i$ is a relative modulation constant, which depends on the type of transistor, e.g., PMOS or NMOS, terminals of the transistor under consideration. The value of $k_i$ can be defined empirically or based on the BSIM-CMG model. In the analysis herein, only the pull-up network of the logic gates is considered. In PMOS transistors, the source/drain contribution is 1.5 times stronger than the gate terminal. $W_i$ and $v_i$ are the width of the terminal and temporal voltage changes on that terminal. The amplitude of EOP signal amplitude, Rr is, $$R_T = \sum_{i=1}^{W_{total\_width}} P_i \times M_i \quad (12)$$

EOP Signal

Figure 12A:
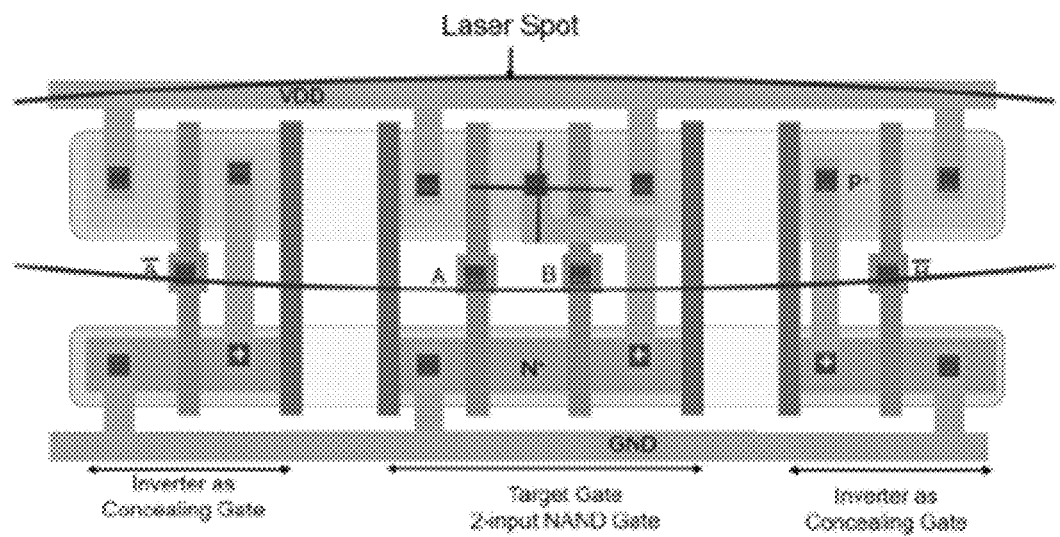
FIG. 12A displays an optical probing scenario wherein the laser spot is focused at the center of an example target gate with two example concealing gates covered by the laser spot, in accordance with one embodiment of the present disclosure.

The effectiveness of concealing-gates in hiding the target-logic elements activity is evaluated against both EOP and EOFM analysis. There are two scenarios where an adversary may attempt while probing the target-gates:

(1) Scenario-1: Focusing the laser spot on the target-gate, hence, photons modulated by the concealing- and target-gates are collected by the photo-detector (see FIG. 12A).

Figure 12B:
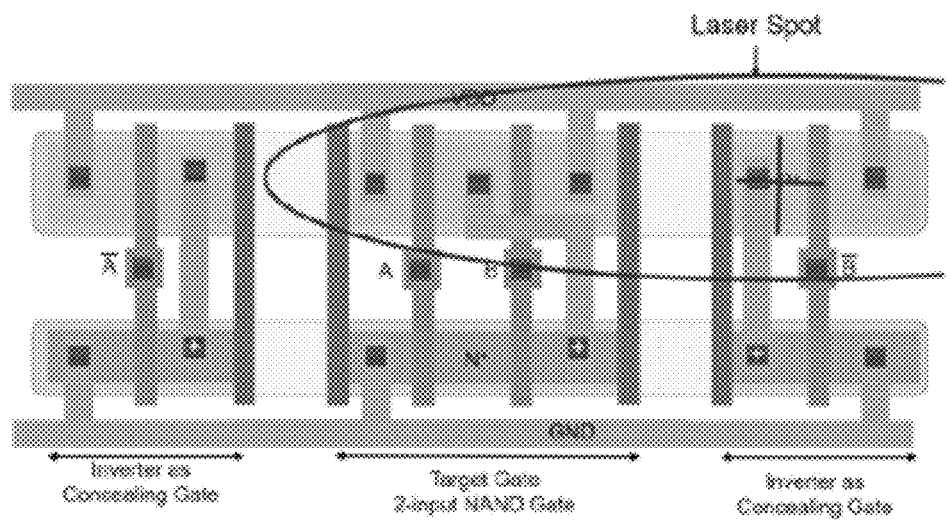
FIG. 12B displays an optical probing scenario wherein an example target gate is placed at one end of the laser spot to reduce the cross-talk from concealing gates, in accordance with one embodiment of the present disclosure.

(2) Scenario-2: The target-gate is placed at one end of the laser spot to reduce the cross-talk from the concealing-gates (see FIG. 12B).

Both of the scenarios are evaluated using the NAND gate as an example target/asset-carrying logic gate. In one embodiment of the invention, INVERTERs are used as concealing-logic gates due to low power and area overhead. Note that a security designer can choose any logic gate as a concealing-gate to hide the functionality of the target-logic element, as long as the inputs of the concealing-gates are Inverted. The EOP signal is generated using Eq. 11 and Eq. 12. The gates are implemented in 32 nm technology nodes. The total width of the logic gates can be defined by Eq. 7 and Eq. 8. It is assumed that the laser is focused on PMOS transistors.

Figure 13A:
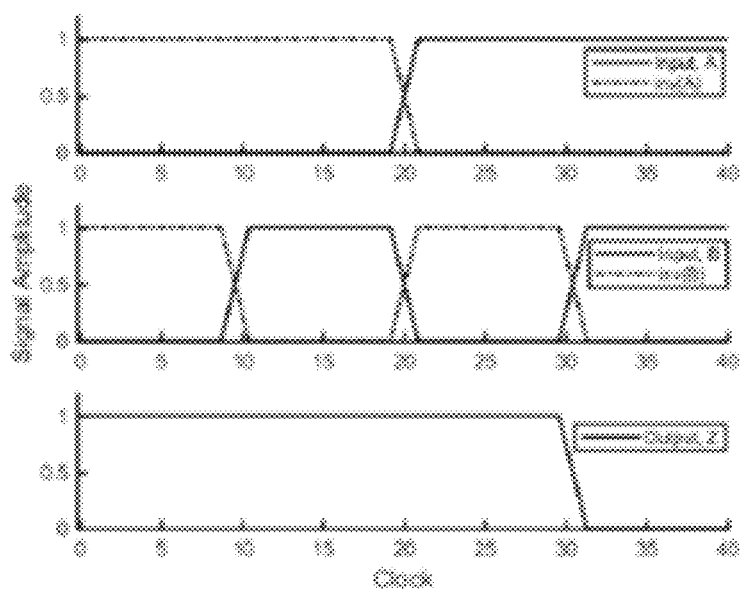
FIG. 13A presents example inputs and output of a target NAND gate, in accordance with one embodiment of the present disclosure.
Figure 13B:
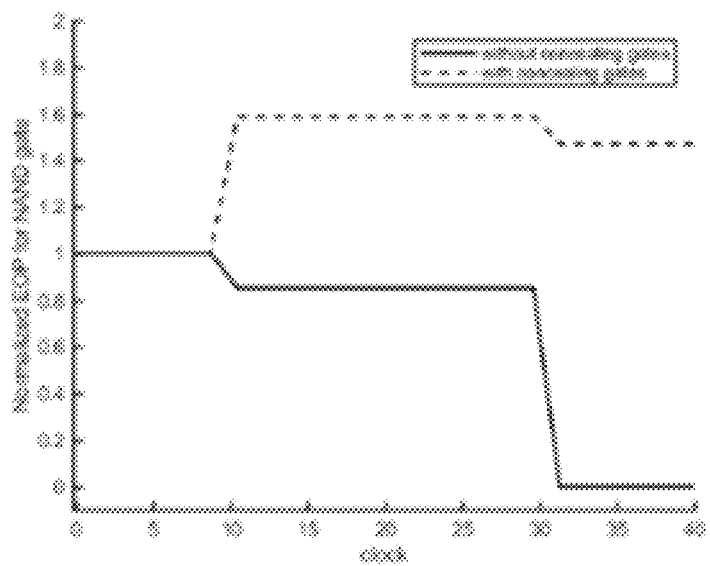
FIG. 13B displays EOP measurements of an example target NAND gate with and without concealing gates in accordance with embodiments of the present disclosure, wherein the example target NAND gate is at the center of laser spot size.
Figure 13C:
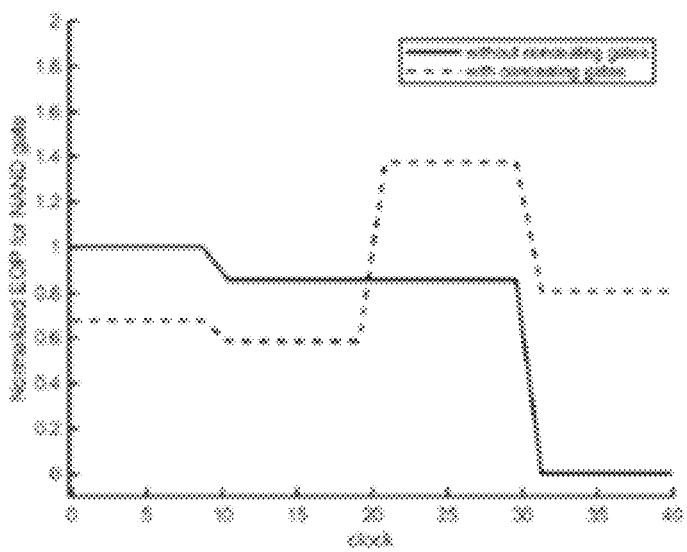
FIG. 13C displays EOP measurements of an example target NAND gate with and without concealing gates in accordance with embodiments of the present disclosure, wherein the example target NAND gate is placed at one end of the laser spot size to remove cross-talk from one of the concealing gates.

The input to the target-NAND gates, and concealing-gates and the NAND cell output, Z, is presented in FIG. 13A. The simulated optical probing signal of a NAND gate without and with concealing-gates, for scenario-1, are showed in FIG. 13B. Though the EOP measurement of the NAND gate without concealing-gate follows similar behavior collected empirically, EOP measurement with concealing-gates reads a higher value than the prior one for certain input combinations. The cross-talk introduced by the concealing-gate forced the EOP signal of the NAND gate to maintain optical probing output as logic "1". Therefore, the switching activity of the target-gate is camouflaged by the concealing-INVERTER gates. Similarly, in scenario-2, the EOP signal with concealing-gates maintain a higher value when the NAND gate output is switched to "0". It is important to note that placing the target-gate at one end of the laser spot, e.g., creating the scenario-2 in real life implementation, requires an in-depth understanding of the laser property, precise control over the stage movement, and higher optical resolution. Therefore, the "Concealing-Gate" approach is effective against an adversary without extensive reverse-engineering capability.

Modulation Capability of the Logic Gates

Figure 14:
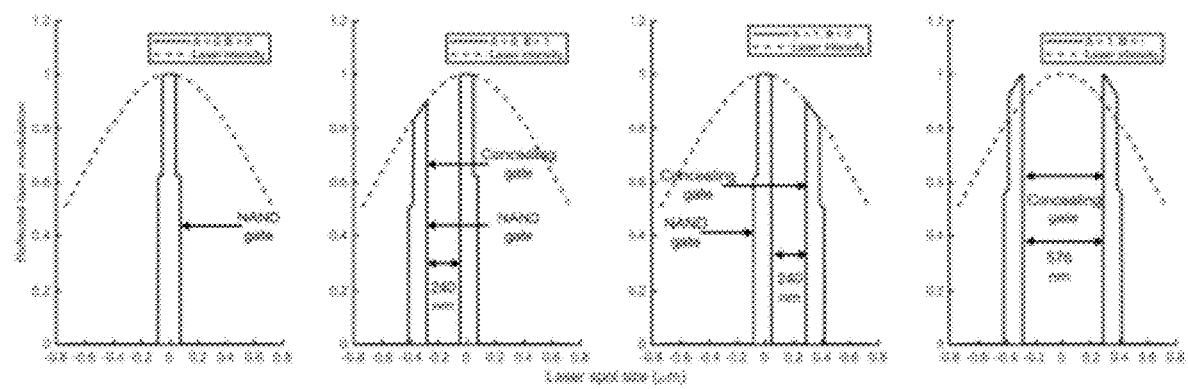
FIG. 14 represents modulation capability of example concealing inverter gates and target NAND gate, in accordance with one embodiment of the present disclosure.
Figure 15:
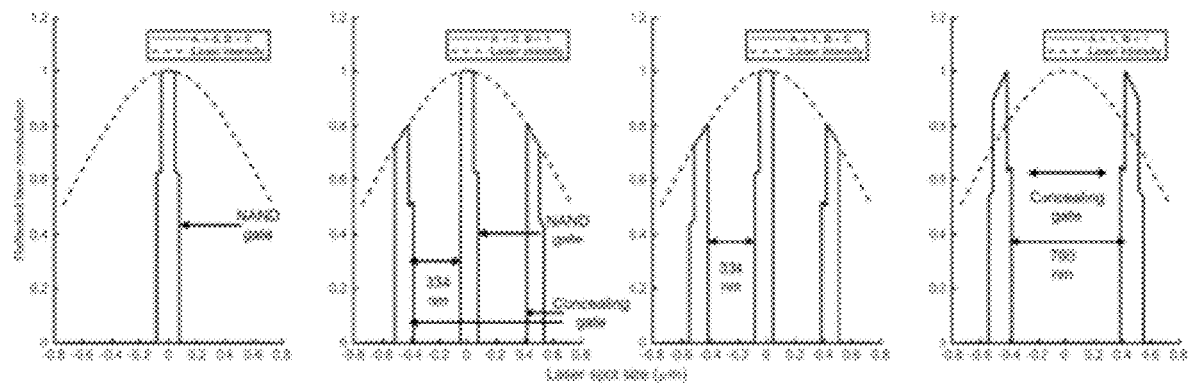
FIG. 15 represents modulation capability of example concealing NAND gate and target NAND gate, in accordance with one embodiment of the present disclosure.

EOFM analysis represents the reflected photons got modulated by transistors operating at a certain frequency. Therefore, the modulation capacity, defined by the Eq. 11 is linearly related to the modulation properties of the reflected photons. Therefore, variation in modulation capacity along the width of logic cells represent the possible EOFM activity source along with its spatial location. However, the modulation capacity cannot be used as a representation of original EOFM or simulated EOFM activity since it does not consider complex photon-material interactions and laser properties. The modulation capability of the PMOS transistors for the scenario-1 (see FIG. 12A) is evaluated, where the activity of the target-NAND gates are disguised with concealing-INVERTER gates. The distance between probable EOFM activity edges, e.g., the $w_1$ and $w_2$, is extracted. FIG. 14 represents the spatial changes in modulation capability along the logic gates width. It has been identified, the $w_1$ and $w_2$ are 240 nm and 576 nm for the input sets, $\{A, B\}=\{0, 1\}$, $\{1, 0\}$ and $\{A, B\}=\{1, 1\}$, respectively. According to Table 1, either $w_1$ and $w_2$ are less than the optical resolution of 1300 nm and 1064 nm laser. Besides, the phase change direction of concealing-input signal and the target-NAND gate inputs are the same, which emphasizes the difficulty in identifying edges of concealing- and target-NAND gate transistors. However, analyzing the modulation capacity for different input signals in FIG. 14, asymmetric footprint in EOFM 2D mapping can be predicted. A security designer can eliminate the asymmetric in EOFM activity shape by using 2-input logic gates, e.g., NAND/NOR gates, to hide logic gates activity (see FIG. 15).

Experimental Validation

Device Under Test (DUT)

Figure 16A:
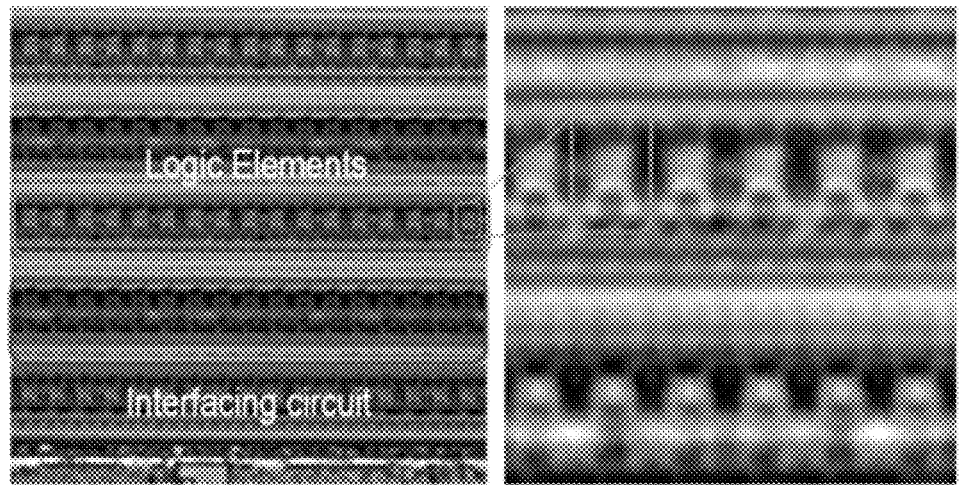
FIG. 16A is an example FPGA logic fabric structure and zooned-in view of logic elements.

The attack resiliency of some embodiment of the invention against optical probing is evaluated in a FPGA platform. The embodiments use an example Flash-based Microsemi MPF300 Polarfire FPGA manufactured with 28 nm technology in a flip-chip BGA package. The FPGA is implemented in an Avalanche FPGA development board. There is no heat sink on top of the package, and hence, there is direct access to the silicon substrate on the backside of the chip without any package preparation or silicon polishing. According to the measurements, the thickness of the substrate is about 700 µm. An 1.3 µm light source is used for acquiring the image of the die without any substrate thinning. FIG. 16A presents the FPGA logic fabric consists of several identical configurable logic blocks (CLBs). The FPGA logic resources are fabricated as logic clusters, as presented in the orange rectangular box in FIG. 16A. The interfacing circuit responsible for the routing between CLBs of the FPGA, is shown in the red rectangle in FIG. 16A. Each cluster consists of twelve logic elements. Each logic element consists of a 4-input LUT with a D-flip-flop. The logic element is fracturable, which means the LUT and flip-flop can be used either together or independently.

Measurement Setup

A Hamamatsu PHEMOS-1000 LSM used for FA is used to perform EOFM analysis over the DUT. The equipment consists of a suitable probing light source (Hamamatsu C13193), and an optical probing preamplifier (Hamamatsu C12323). The development board is placed inside the PHEMOS and a PC is connected to the board to program the FPGA. Programming of the FPGA is performed through USB which is handled by an FTDI chip and powered by the development board supply. A 50×/0.76 NA lens is used to generate the 2D mapping of the EOFM activity of the circuit.

Proof-of-Concept Circuit Implementation

Figure 16B:
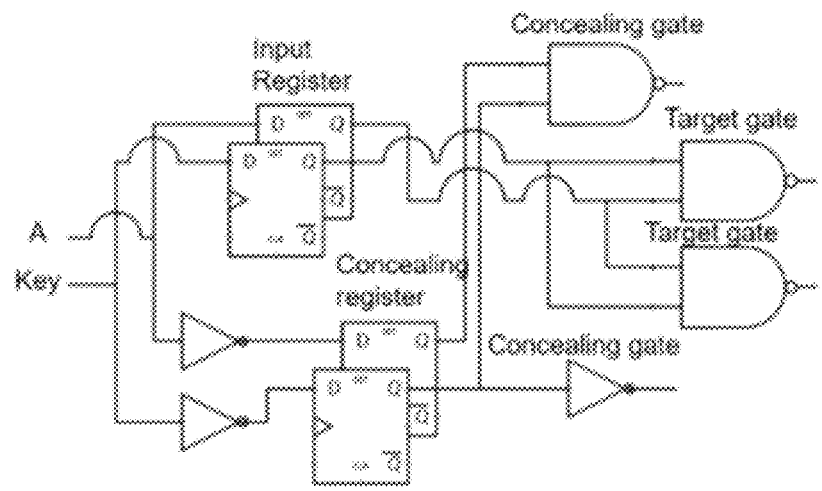
FIG. 16B is an example implementation of an example circuit where target NAND gates are protected by concealing gates.

For the experiment, an example Proof-of-concept (PoC) circuit is implemented in the DUT. The target-NAND gates, in the PoC circuit (see FIG. 16B), are connected to input A and Key-input, Key. Each target-gate is implemented with a single concealing-gate. The concealing-gates are connected to the inverted signal of the key-input and signal A. The inputs in the PoC circuit are fed through flip-flops. Four of the PoC concealing-gate circuit are implemented in the FPGA and the EOFM activity is measured with and without concealing-INVERTER and NAND gates.

Experimental Results

The concealing-gates are considered successfully camouflaged if the following properties are fulfilled:

(1) the target-gate activity in the EOFM activity is always present. This satisfies the frequency matching and switching inputs property of EOFM concealing.

(2) the EOFM activity edges of concealing- and target-logic gates are indistinguishable, irrespective to the input pattern applied to the device. This satisfies the distinguishable edges property of the EOFM concealing.

To probe the keys from key-registers and target-logic gates, three input vectors are compared, $x_0$, $x_1$, and $\bar{x}_1$ where the inputs for $x_0$, $x_1$, and $\bar{x}_1$ are 0000, 1100, and 0011. Since the chip does not perform any functions during the boot-up process, it can be assumed that all the input ports are set to an inactive or grounded state. Hence, the input vector $x_0$ can be a representation of the boot-up condition of the chip.

Figure 17A:
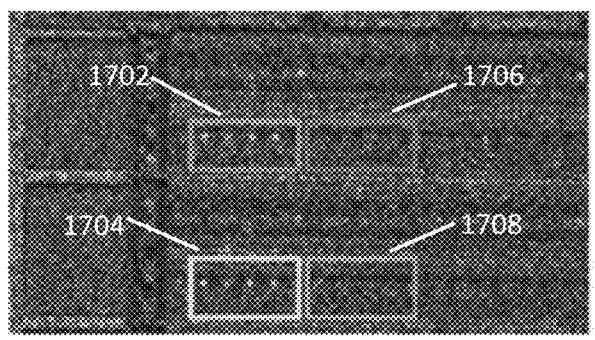
FIG. 17A is an example FPGA with concealing gates implemented in accordance with some embodiments of the present disclosure, where the area containing the sequential and combinatorial logic gates is identified by analyzing the EOFM activity.
Figure 17B:
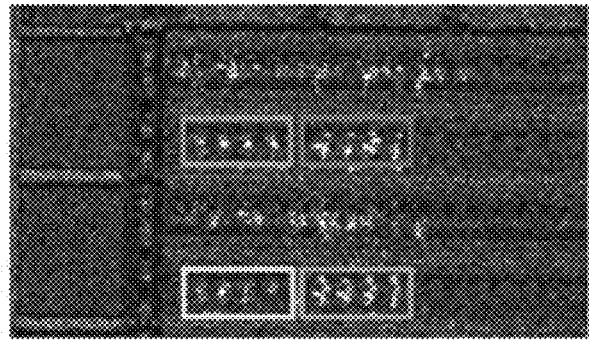
FIG. 17B displays EOFM measurement of example target logic elements with concealing gates in accordance with one embodiment of the present disclosure, wherein the key value is probed with an input vector 0000.
Figure 17C:
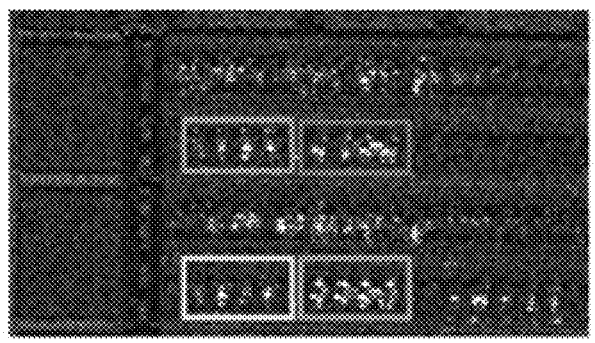
FIG. 17C displays EOFM measurement of example target logic elements with concealing gates in accordance with one embodiment of the present disclosure, wherein the key value is probed with an input vector 1100.
Figure 17D:
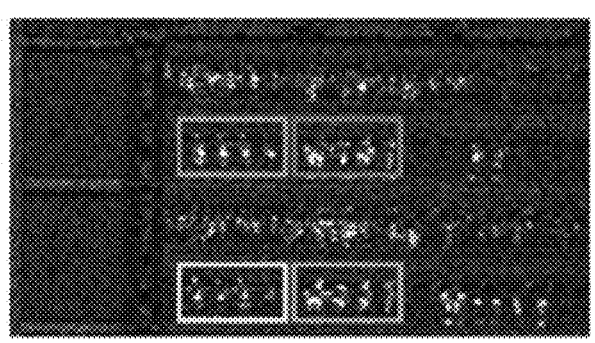
FIG. 17D displays EOFM measurement of example target logic elements with concealing gates in accordance with one embodiment of the present disclosure, wherein the inverted key value is probed with an input vector 0011.
Figure 18A:
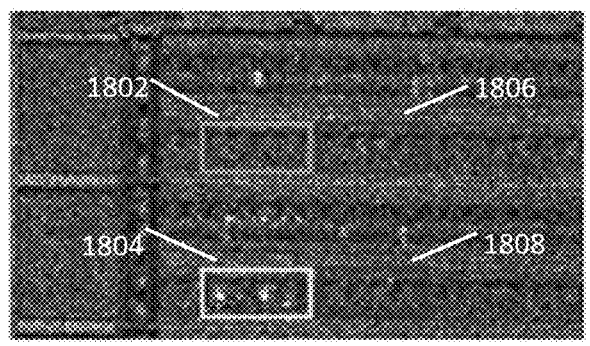
FIG. 18A is an example FPGA without concealing gates, where the area containing the sequential and combinatorial logic gates is identified by analyzing the EOFM activity.
Figure 18A:
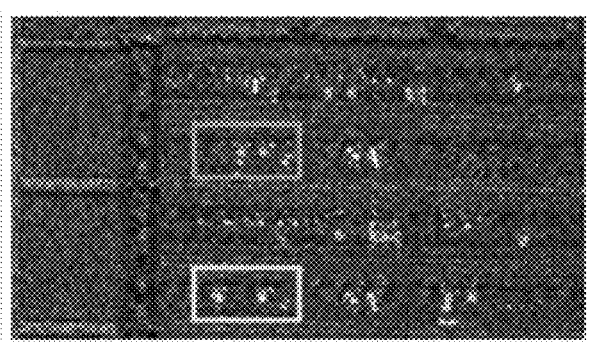

An adversary can identify the area containing the sequential and combinatorial logic gates by analyzing the EOFM activity of clock signal, as shown in FIG. 17A. The green and yellow rectangles 1702, 1704 represent the locations of input register and key-register, respectively, and both are implemented with concealing registers. The blue and orange rectangles 1706, 1708 represent the locations of a target gate with concealing NAND gate, and a target gate with concealing inverter gate, respectively. The EOFM measurement of target-logic elements with concealing-gates, shown in FIG. 17B and FIG. 17C, are measured for the same key value with input signals $x_0$ and $x_1$, respectively. FIG. 17D contains the inverted key compared to the aforementioned figures with input signal $\bar{x}_1$. Since, either target- or concealing-logic elements is active for different inputs (see FIG. 17A, 17B, 17C, 17D), the logical state of the target-gate cannot be predicted without the knowledge of gate-level netlist, which can be extracted with only full-blown reverse engineering. In addition, inverting the inputs does not induce significant change in EOFM activity which can be interpreted with human eyes (see FIG. 17C and FIG. 17D). Unlike PoC implemented with concealing-gates, the activity of the key-registers and key-gates can be exposed from the EOFM activity (see FIG. 18A and FIG. 18B). In FIGS. 18A, 18B, the green, yellow, and red rectangles 1802, 1804, 1806, 1808 represent locations of input register, key-register, and two target NAND logic gates, respectively. The key value extracted from the EOFM activity is "0101".

Resiliency Against Image Processing and Computer Vision Analysis

Figure 19A:
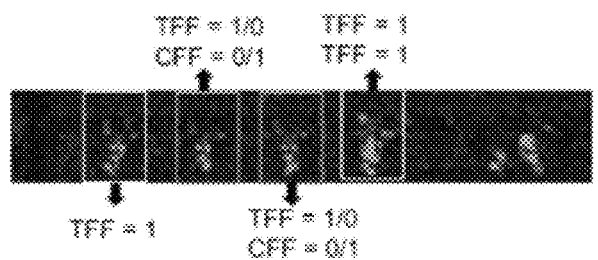
FIG. 19A displays EOFM activity mapping of an example flip-flop implemented with and without concealing flip-flop.
Figure 19B:
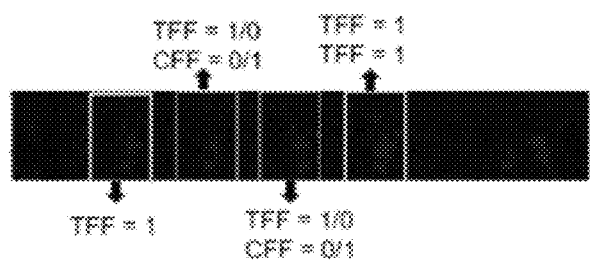
FIG. 19B displays EOFM activity mapping of an example flip-flop implemented with and without concealing flip-flop, wherein the input of one target flip-flop protected with concealing gate is flipped compared with FIG. 19A.
Figure 19C:
FIG. 19C displays EOFM activity of FIG. 19A and FIG. 19B after image registration.

An adversary may attempt to distinguish the activity of the key-gates/registers from concealing-gates in EOFM measurement, using image processing and computer vision techniques. An adversary can collect multiple EOFM measurements for different input patterns and use image processing to extract the key value. To evaluate the performance of the concealing-gate, one embodiment of the invention implements a flip-flop protected with a concealing-flip-flop (see orange rectangle in FIG. 19A and FIG. 19B) and compared the EOFM activity with the exposed target-flip-flop (see white rectangle in FIG. 19A and FIG. 19B). A 50×/0.76 NA lens is used with additional 2X zoom to evaluate the attack resiliency for the embodiment. It is evident that due to the presence of concealing-gates, the optical probed data form EOFM activity is "1", irrespective to the data stored in target-flip-flop. The registered images of the FIG. 19A and FIG. 19B are shown in FIG. 19C, which shows negligible spatial shift due to change in input signal to protected target-flip-flop.

Optical Resolution and Laser Spot Size

It is mostly argued that optical probing is reaching its limit due to low optical resolution. However, in reality, an adversary attempts to probe the entire logic gate, register or cache memory cells. The optical resolution can be further increased once the adversary has access to a solid immersion lens (SIL). SIL can improve the NA by the refractive index times of the SIL material. Table 6 presents the resolution and laser spot size with SIL. The challenge of making use of SIL is that the DUT must be polished down to 10-30 µm. Though there has been a significant advancement in automated backside polishing, the process still require higher processing time. Besides, in the flip-chip ball grid (BGA) packages, the BGA leaves shadow marking due to higher pressure applied during bulk silicon polishing. In addition, the effort significantly increases if the chip is implemented in a PCB.

Table 6. Optical resolution and laser spot diameter for different wavelength laser and lens.

| Wavelength + Lens | NA | Resolution (nm) | Diameter (nm) |
|---|---|---|---|
| 1300 nm + 50x lens* | 0.76 | 855 | 1476 |
| 1064 nm + 50x lens* | 0.76 | 700 | 1208 |
| 1300 nm + SIL** | 3.5 | 185 | 453 |
| 650 nm + SIL** | 3.4 | 95.6 | 233 |

*= 50X is objective lens used in optical attacks.
**= SIL stands for solid immersion lens.

Attack Resiliency

The success of the method and system disclosed herein depends on increasing time-cost of standard cell identification and full-blown reverse engineering. An adversary can read the logical state of any combinatorial or sequential gate if the adversary can extract the gate-level netlist of the device. A reverse engineer's task can be made difficult by implementing physical layout obfuscation techniques like camouflage cells, covert gate, dummy vias, filler cells, etc. in the chip. In addition, only extracting the standard cell library is not enough to identify the functionality of the target-cells along with the concealing-gate. Moreover, recently proposed covert gate based physical layout obfuscation method can protect the logic gate detection from imaging tools and functional analysis. Since understanding the input signal to each logic element and identifying the implemented logic gates can only facilitate interpreting the optical probing signal, implementing concealing-gates with covert gates-based layout obfuscation will make an SoC bulletproof against optical probing attack. Therefore, an attempt to bypass the necessity of full-blown reverse engineering by recognizing the standard cell library using active layer and via detection is futile.

CONCLUSION

Various embodiments of the disclosure represent a design methodology to implement a contactless optical probing resistance design. This technique uses standard cell library to prepare a circuit based countermeasure against chip backside attacks. The method can be readily applied to both ASIC and FPGA design flow. A security metric is developed to evaluate the optical attack resiliency of the device. A simulation-based study validates the efficacy of the countermeasure. Experimental results have also demonstrated that the presented countermeasure is an effective technique to protect the chip activity from chip backside optical attacks. Since this technique is based on the equal number of switching in the asset carrying modules, the protection mechanism can be extended to protect device secrets form side-channel analysis.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

That which is claimed:

1. A method of concealing a logic state in a target logic circuit against an optical probing, wherein the target logic circuit is coupled to at least one input signal, the method comprising:
    forming one or more concealing logic circuits in close optical proximity to the target logic circuit, wherein:
        the target logic circuit comprises a target transistor, the target transistor is one of NMOS transistor or PMOS transistor;
        the one or more concealing logic circuits comprise a concealing transistor, the concealing transistor is a same type transistor as the target transistor;
        the target transistor is coupled to a first input signal of the at least one input signal, wherein in response to the first input signal, the target transistor operates in either a saturation region or a cutoff region; and
        the concealing transistor is coupled to a complement of the first input signal, wherein, in response to the complement of the first input signal, the concealing transistor operates in an opposite region of operation region of the target transistor.

2. The method of claim 1, further comprising:
    forming an evaluation circuit, wherein the evaluation circuit couples the at least one input signal to the target logic circuit, generates the complement of the at least one input signal to the one or more concealing logic circuits, and minimizes a path delay between target logic circuit input and the one or more concealing logic circuits input.

3. The method of claim 1, wherein the target and concealing transistors have the same width and length.

4. The method of claim 1, wherein the target logic circuit comprises a target NAND gate coupled to two input signals, and the one or more concealing logic circuits comprise two concealing inverters, wherein each of the two concealing inverters is coupled to a complement of a different one of the two input signals.

5. The method of claim 1 wherein the target logic circuit comprises a target NAND gate coupled to two input signals, and the one or more concealing logic circuits comprise a concealing NOR gate coupled to complements of the two input signals.

6. The method of claim 1, wherein the target logic circuit comprises a target flip-flop or a target latch coupled to an input signal, and the one or more concealing logic circuits comprise a concealing flip-flop or a concealing latch coupled to a complement of the input signal.

7. The method of claim 1, wherein the target logic circuit comprises a target register coupled to an input signal, and the one or more concealing logic circuits comprise a concealing register coupled to a complement of the input signal.

8. The method of claim 1, wherein the close optical proximity is defined as a distance between the one or more concealing logic circuits and the target logic circuit being less than an optical resolution of the optical probing.

9. A circuit concealing a logic state in a target logic circuit against an optical probing, wherein the target logic circuit is coupled to at least one input signal, the circuit comprising:
one or more concealing logic circuits in close optical proximity to the target logic circuit, wherein:
the target logic circuit comprises a target transistor, the target transistor is one of NMOS transistor or PMOS transistor;
the one or more concealing logic circuits comprise a concealing transistor, the concealing transistor is a same type transistor as the target transistor;
the target transistor is coupled to a first input signal of the at least one input signal, wherein in response to the first input signal, the target transistor operates in either a saturation region or a cutoff region; and
the concealing transistor is coupled to a complement of the first input signal, wherein, in response to the complement of the first input signal, the concealing transistor operates in an opposite region of operation region of the target transistor.

10. The circuit of claim 9, further comprising:
an evaluation circuit, wherein the evaluation circuit couples the at least one input signal to the target logic circuit, generates the complement of the at least one input signal to the one or more concealing logic circuits, and minimizes a path delay between target logic circuit input and the one or more concealing logic circuits input.

11. The circuit of claim 9, wherein the target and concealing transistors have the same width and length.

12. The circuit of claim 9, wherein the target logic circuit comprises a target NAND gate coupled to two input signals, and the one or more concealing logic circuits comprise two concealing inverters, wherein each of the two concealing inverters is coupled to a complement of a different one of the two input signals.

13. The circuit of claim 9, wherein the target logic circuit comprises a target NAND gate coupled to two input signals, and the one or more concealing logic circuits comprise a concealing NOR gate coupled to complements of the two input signals.

14. The circuit of claim 9, wherein the target logic circuit comprises a target flip-flop or a target latch coupled to an input signal, and the one or more concealing logic circuits comprise a concealing flip-flop or a concealing latch coupled to a complement of the input signal.

15. The circuit of claim 9, wherein the target logic circuit comprises a target register coupled to an input signal, and the one or more concealing logic circuits comprise a concealing register coupled to a complement of the input signal.

16. The circuit of claim 9, wherein the close optical proximity is defined as a distance between the one or more concealing logic circuits and the target logic circuit being less than an optical resolution of the optical probing.

\* \* \* \* \*